US005178181A

United States Patent [19]

Craig

[11] Patent Number: 5,178,181

[45] Date of Patent: Jan. 12, 1993

[54] FERTILIZER DISPENSER

[76] Inventor: James Craig, 2925 Cody St., Riverside, Calif. 92503

[21] Appl. No.: 786,706

[22] Filed: Nov. 1, 1991

[51] Int. Cl.[5] ........ B01D 11/02

[52] U.S. Cl. ........ 137/268; 422/261; 422/282

[58] Field of Search ........ 137/268; 422/261, 264, 422/279, 281, 282

[56] References Cited

U.S. PATENT DOCUMENTS

| | | | |
|---|---|---|---|
| 846,100 | 3/1907 | Estep | 137/268 U X |
| 1,193,038 | 8/1916 | Mann | 137/268 X |
| 2,613,994 | 10/1952 | Peters | 137/268 X |
| 2,680,044 | 6/1954 | Smith | 137/268 X |
| 2,758,877 | 8/1956 | Gleason | 137/268 X |
| 3,753,444 | 8/1973 | Winton | 137/268 |
| 4,908,190 | 3/1990 | Maglio | 137/268 X |
| 4,957,134 | 9/1990 | Craig | 137/268 |

*Primary Examiner*—Alan Cohan
*Attorney, Agent, or Firm*—Willie Krawitz

[57] ABSTRACT

A fertilizer applicator is provided for use with a sprinkler line system. The applicator comprises a fertilizer container with integrally formed internal inlet and outlet tubes. Water is fed through an inlet-outlet tube into the bottom of the fertilizer container, where it dissolves or dilutes some of the solid or liquid fertilizer and forms a leached, concentrated solution. This concentrate continuously rises through the fertilizer and into the outlet tube where it drains downwardly. The concentrate is then diluted with water coming through the inlet-outlet tube including a venturi, the size of which controls the flow rate of the concentrate. The diluted concentrate is then passed into the sprinkler system for application to vegetation. The applicator has a single piece, simplified design, without moving parts, and does not leak fertilizer into the drain. Also, the bore arrangement of the applicator enables the device to be drained and then filled with fertilizer, without fertilizer leakage, followed by running water through the fertilizer at any selected time, and this renders the operation more automatic.

4 Claims, 1 Drawing Sheet

FERTILIZER DISPENSER

BACKGROUND OF THE INVENTION

This invention relates to a new and improved fertilizer applicator for use with sprinkler systems. These devices tend to be cumbersome, complicated, and some require moving parts. Other devices employ meters which are in themselves expensive. Many of these components could be eliminated if the fertilizer applicator system utilized a simple entry and drain bore systems for water and leached fertilizer, respectively.

Also in many instances, it would be desirable to add liquid ingredients to the solid fertilizer when feeding into a sprinkler system. These liquid ingredients could include insecticides, herbicides, and various fertilizers which are relatively expensive such as chelates, hormones, and other specialty chemicals.

In Applicant's U.S. Pat. Nos. 4,750,512, 4,898,202, and 4,957,134 fertilizer applicators are disclosed in which water from a supply line is fed to the top of the fertilizer container and then percolates downwards through the fertilizer. Leached, concentrated liquid fertilizer from the applicator is blended with water, and the diluted fertilizer solution passes through outlet bores, and then flows out of the applicator to the sprinkler system.

These prior art devices tend to be somewhat complex, and it would be desirable to simplify their construction and operation, both in terms of reducing the number of components, and in producing a device which is more rugged. Preferably, a single piece fertilizer applicator is desired in which the inlet and outlet bore components are built-into the sidewall of the applicator thereby producing a more rugged device.

Another problem with prior art devices is that some tend to leak undiluted fertilizer into the drain, and this undiluted fertilizer may be then applied to plant life in excessively high dosages.

In addition, it would be preferable for a fertilizer applicator to be attached to an anti-siphon valve enabling it to be drained and filled with fertilizer, followed by turning on the water supply system on the anti-siphon valve immediately or at some future time. This would render the operation of such a device much more automatic. One commercial device employs a top filling water source and a bottom drain orifice together with a three-way valve. However, this system requires that the fertilizer be completely filled with water before the water supply system is turned on, to prevent undissolved solid fertilizer from falling out the bottom drain bore. Hence, the user cannot turn on the water sprinkler system immediately, but must return to the anti-siphon valve to turn on the system, and such a system does not function automatically.

THE INVENTION

According to the invention, there is provided a fertilizer applicator comprising a fertilizer holder, and internal water inlet and overflow tubes built into the interior sidewalls of the container.

Water is fed to the bottom of the fertilizer holder and percolates upwardly through the fertilizer, and a concentrated fertilizer solution then overflows downwardly into the outlet tube. The solution is combined and further diluted with water passing through a pre-set venturi, which controls the desired fertilizer concentration, in addition to the volume of dilution water.

DESCRIPTION OF THE PREFERRED EMBODIMENTS

Figure 1:
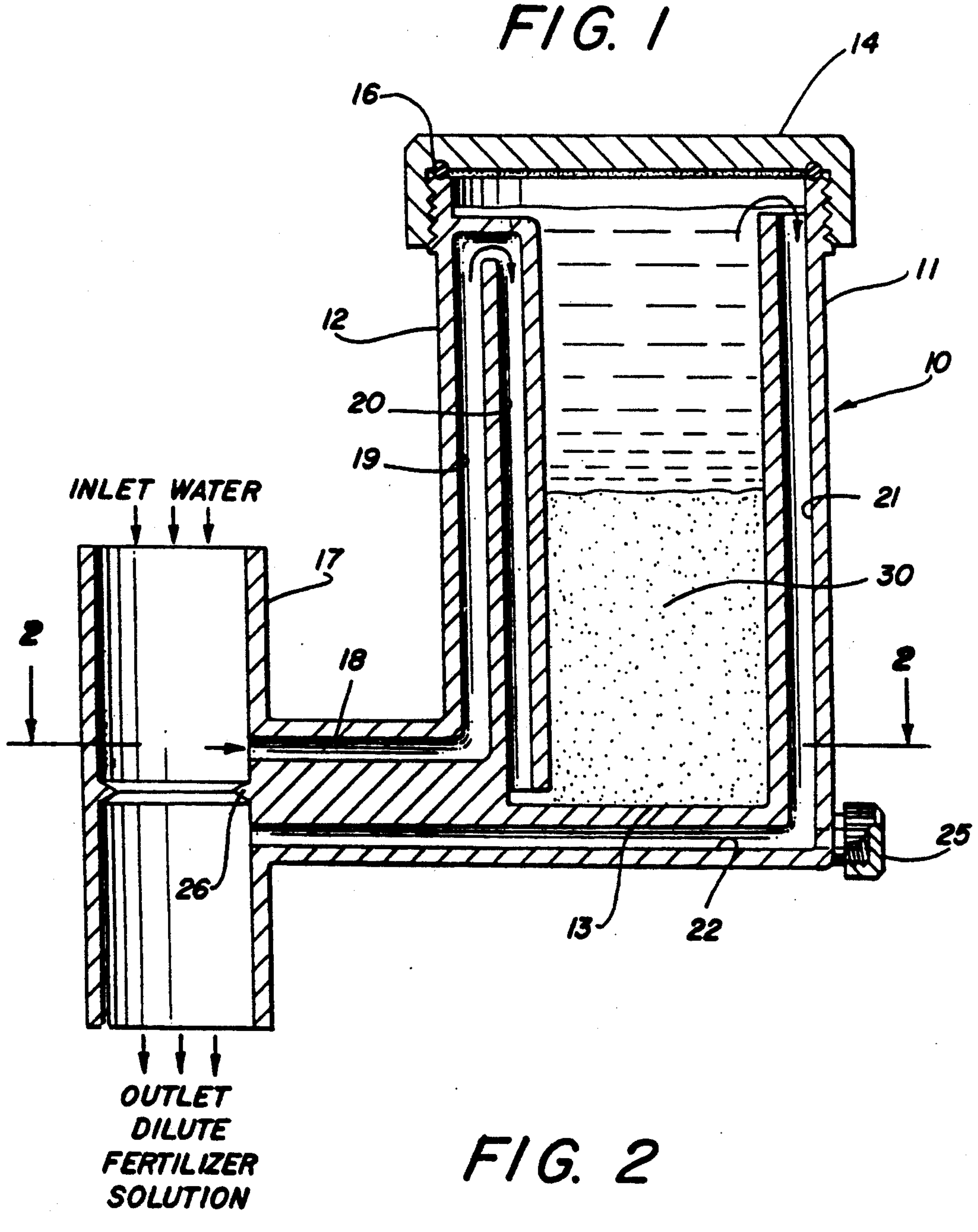
FIG. 1 is a sectional view in side elevation of the fertilizer applicator of this invention; and, FIG. 2 is a sectional plan view taken along lines 2—2 of FIG. 1.
Figure 2:
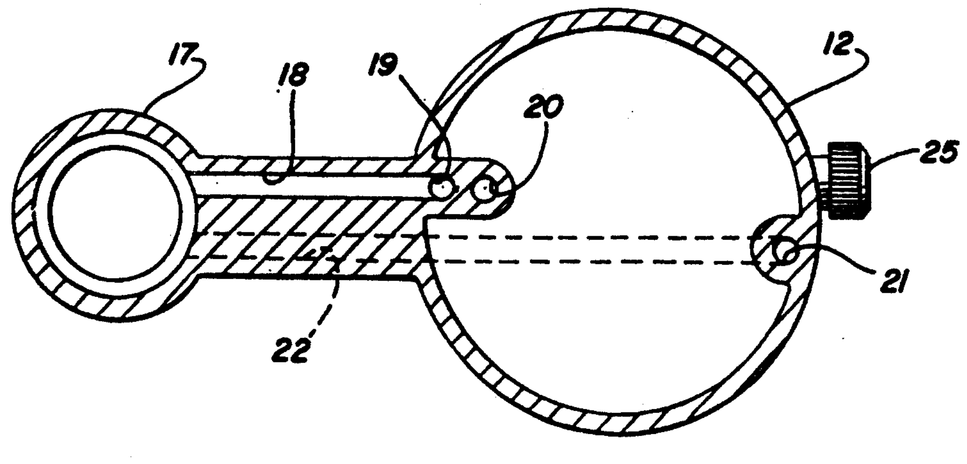

The fertilizer applicator 10 of this invention is shown in FIGS. 1 and 2, and comprises a one-piece fertilizer container 11 having a circular sidewall 12 and a bottom portion 13. A cover 14 is attached to the container 11 by threads 15, and an 0-ring 16 seals the cover against leakage from the container of leached fertilizer.

The applicator includes an inlet-outlet tube 17 leading to a horizontal inlet bore 18 and then to bores 19, 20 integrally formed with the sidewall 12. An upstanding outlet bore 21 for leached fertilizer solution is also integrally formed with the sidewall 12 and leads downwardly from the top of the fertilizer container to outlet of the inlet-outlet 17 through a drain bore 22. A drain plug 25 is threaded to the container 11, and enables the container to be drained, when required. A venturi 26 of suitable size is formed within the inlet-outlet tube 17 and forces inlet water back through inlet bores 18, 19 and 20 and into the container 11.

Solid fertilizer 30 in the form of granules, powder, pellets, etc., or liquid fertilizer, is placed into the container for leaching with water. Alternatively, the fertilizer may be loaded in porous bags, and this reduces the presence of unhealthful dust compared to loading of loose, solid material.

Other liquid and solid ingredients may be included with the solid fertilizer such as plant growth regulants, hormones, herbicides, fungicides, weedicides, insecticides, soil penetrants, liquid fertilizer, etc. The liquids may be applied to and be absorbed by the solid fertilizer for subsequent leaching, which enables use of a wider spectrum of materials without requiring a change of equipment.

Water from a sprinkler system (not shown) is fed to the inlet-outlet tube 17 of the fertilizer applicator 10, and enters the inlet bores 19, 20 and 21. The volume of inlet water is set by the closure size of the venturi 26 and by the amount of water flowing through the sprinkler system. Water injected through the inlet bores flows into the bottom of the fertilizer applicator where it contacts and dissolves some of the fertilizer 30 and becomes further enriched as it rises through the fertilizer in the applicator prior to draining out through the upstanding bore 21 and drain bore 22.

The enriched effluent solution is then diluted in the outlet of the inlet-outlet tube 17 with water passing through venturi 26, and the dilute solution is then passed into the sprinkler system for spraying onto vegetation.

The fertilizer applicator of this invention has no moving parts, and the integrally formed bores provides a rugged device. Moreover, the use of screens has been eliminated, and the container construction has been simplified to a one piece container. Additionally, the applicator fills with water from bottom to top, and this virtually eliminates the loss of dry fertilizer or liquid concentrate from the system. Also, bottom to top loading enables an almost automatic operation.

I claim:

1. A fertilizer applicator for connection to a sprinkler system, comprising:

a container for holding a solid fertilizer mass, including: a sidewall member and integrally formed bottom member; a removable top member to enable loading the fertilizer into the container and for sealing the container against leakage of fertilizer solution; inlet and outlet tubes integrally formed within the sidewall member the inlet tube defining a bore through the sidewall member and which extends upwardly along and within the sidewall and downwardly to the bottom member, and spaced therefrom, and the outlet tube defining a downwardly draining bore within the sidewall and extending downwardly from ear the top member; a drain bore integrally formed with and along the bottom member and connecting with the outlet tube to downwardly drain a leached, concentrated solution of fertilizer from the solid fertilizer mass and out the outlet tube, the inlet tube being adapted to feed inlet water to the bottom of the solid fertilizer mass, for upward movement and leaching or dilution of the fertilizer to produce the concentrated solution of fertilizer; the outlet tube downwardly feeding the solution from the fertilizer mass to the drain bore; and inlet-outlet tube connecting to the inlet tube for feeding water thereto and for receiving fertilizer solution from the drain bore at its outlet for further dilution with inlet water; a venturi element positioned within the inlet-outlet tube and between the inlet tube and the drain bore at its outlet; and, a drain plug for draining water from the container; whereby, when the container is drained nd then filled with solid fertilizer, inlet water from the sprinkler system can be turned on, without loss of the solid fertilizer, thereby enabling passage of water for leaching the solid fertilizer at any given time to form the said concentrated solution.

2. The fertilizer applicator of claim 1, in which the solid fertilizer mass contains a liquid absorbed therein.

3. The fertilizer applicator of claim 2, in which the said liquid is selected from the class consisting of: insecticides, fungicides, weedicides, herbicides, plant growth regulants, hormones, soil penetrants and fertilizers.

4. The fertilizer applicator of claim 1, in which the fertilizer is contained in a water permeable bag.

* * * * *